(12) United States Patent
Yoda et al.

(10) Patent No.: US 7,341,968 B2
(45) Date of Patent: Mar. 11, 2008

(54) GLASS PLATE AND METHOD FOR TEMPERING A GLASS PLATE

(75) Inventors: Kazushige Yoda, Chita-gun (JP); Yasumasa Kato, Yokohama (JP); Shuichi Akada, Yokohama (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 11/625,021

(22) Filed: Jan. 19, 2007

(65) Prior Publication Data

US 2007/0117707 A1 May 24, 2007

Related U.S. Application Data

(62) Division of application No. 10/103,987, filed on Mar. 25, 2002.

(30) Foreign Application Priority Data

Mar. 30, 2001 (JP) ............................. 2001-099201
Sep. 26, 2001 (JP) ............................. 2001-293601

(51) Int. Cl.
*C03C 3/087* (2006.01)
(52) U.S. Cl. .......................................... 501/70; 501/71
(58) Field of Classification Search ................ 501/70, 501/71
See application file for complete search history.

(56) References Cited

U.S. PATENT DOCUMENTS

| 3,706,544 A | 12/1972 | Michalik |
| 3,765,859 A | 10/1973 | Seymour |
| 3,794,476 A | 2/1974 | Michalik et al. |
| 3,890,128 A | 6/1975 | Melling et al. |
| 5,851,940 A | 12/1998 | Boulos et al. |
| 6,391,810 B1 * | 5/2002 | Lenhart ........................ 501/59 |
| 6,844,280 B2 * | 1/2005 | Koyama et al. ............... 501/70 |

FOREIGN PATENT DOCUMENTS

| CN | 1263511 | 8/2000 |
| DE | 4010718 | 10/1990 |
| EP | 0 555 552 | 8/1993 |
| EP | 0 864 546 | 9/1998 |
| EP | 1 013 619 | 6/2000 |
| GB | 2 232 978 | 1/1991 |
| GB | 2232978 | 1/1991 |
| JP | 63-040743 | 2/1988 |
| JP | 4-60059 | 9/1992 |
| JP | 09-208246 | 8/1997 |
| WO | WO 01/16040 | 3/2001 |
| WO | WO 0166477 A1 * | 9/2001 |

OTHER PUBLICATIONS

English Translation of JP 63-040743.*
Derwent Abstract 1988-088951. Abstract of JP 63-040743.*
Derwent Abstract 1986-26940. Abstract of JP 61-197444.*
Patent Abstract of Japan, JP 61-197444, Sep. 1, 1986.
Patent Abstract of Japan, JP 63-040743, Feb. 22, 1988.
Type of Glass, http://www.glasstopia.com/e_site/glassis/category/species/byproduct.html.
Viscosity of Glass, http://www.a-m.de/englisch/lexikon/viskositaetglas.htm (2004).
"Glass—An Overview", http://www.azom.com/details.asp?ArticleID=1021 (2004).

* cited by examiner

*Primary Examiner*—J. A. Lorengo
*Assistant Examiner*—Elizabeth A. Bolden
(74) *Attorney, Agent, or Firm*—Oblon, Spivak, McClelland, Maier & Neustadt, P.C.

(57) ABSTRACT

A glass plate; a glass plate having a thickness of 2 to 3 mm; a glass plate obtained by a float process; and, a window glass for automobiles.

12 Claims, No Drawings

GLASS PLATE AND METHOD FOR TEMPERING A GLASS PLATE

CROSS REFERENCE TO RELATED APPLICATIONS

This application is a divisional application of U.S. application Ser. No. 10/103,987, filed on Mar. 25, 2002, which is currently pending. The application claims priority to U.S. application Ser. No. 10/103,987, Japanese Application No. 2001-9099201, filed on Mar. 30, 2001, and Japanese Application No. 2001-293601, filed on Sep. 26, 2001, all of which are incorporated herein by reference.

The present invention relates to a glass plate capable of being readily tempered by heat and a method for tempering it.

Conventionally, a glass plate made of general soda lime silicate is used as a base plate for a tempered glass by heat. Such a tempered glass is produced usually by quenching a base plate after heating it to a predetermined initial glass temperature of quenching. This quenching is carried out by blowing an air to the heated glass plate in many cases.

In recent years, for weight saving of automobiles, it is required to produce a window glass for automobiles with a further thinner glass plate. However, if the thickness of the glass plate is from 2 to 3 mm, it is required to greatly increase the degree of quenching, and a conventional method can not be applied.

Accordingly, it is an object of the present invention to provide a glass plate capable of being readily tempered even if it has a thickness at a level of from 2 to 3 mm, and a method for tempering a glass plate.

In order to overcome the above problem, the present invention provides a method for tempering a glass plate having a thickness of from 2 to 3 mm, and having an average linear thermal expansion coefficient of at least $88 \times 10^{-7}/°$ C. at a temperature of from 50 to 300° C. and a softening point of from 715 to 740° C., which comprises quenching the glass plate from an initial glass temperature of quenching at which the viscosity is within a range of from $10^9$ to $10^{10}$ poise to a temperature at which the viscosity is $10^{12}$ poise, so that the heat transfer coefficient h (W/m$^2$K) satisfies the following formula (1), where t (mm) is a glass plate thickness:

$$h > 4970.5 - 3149.9t + 550.3t^2 \quad \text{formula (1)}$$

Further, the present invention provides a method for tempering a glass plate having a thickness of from 2 to 3 mm, and having an average linear thermal expansion coefficient of at least $88 \times 10^{-7}/°$ C. at a temperature of from 50 to 300° C. and a softening point of from 715 to 740° C., which comprises quenching the glass plate from an initial glass temperature of quenching at which the viscosity is within a range of from $10^9$ to $10^{10}$ poise to a temperature at which the viscosity is $10^{12}$ poise, so that the heat transfer coefficient h (W/m$^2$K) satisfies the following formula (2), where t (mm) is a glass plate thickness:

$$h > 2123.6 \cdot t^{-1.4641} \quad \text{formula (2)}$$

The present invention further provides the above method for tempering a glass plate, wherein a glass plate having the following composition is tempered:
SiO$_2$ 66.0-74.0 mass %,
Al$_2$O$_3$ 1.5-4.0 mass %,
CaO 7.0-10.0 mass %,
MgO 3.8-6.0 mass %,
Na$_2$O 12.6-14.6 mass % and
K$_2$O 0.4-2.0 mass %, in a total amount of these components of at least 96 mass %, and
SiO$_2$+Al$_2$O$_3$ 70.0-74.4 mass %,
CaO+MgO 12.0-14.5 mass % and
Na$_2$O+K$_2$O 13.5-15.5 mass %.

The present invention further provides the above method for tempering a glass plate, wherein a glass plate having the following composition is tempered:
Al$_2$O$_3$ 2.0-4.0 mass %,
CaO+MgO 12.5-14.5 mass % and
CaO/MgO (mass ratio)=1.7-2.2.

Further, the above glass plate preferably has a thickness of from 2 to 3 mm. Further, the above glass plate is preferably one produced by a conventional float glass process. Further, the above glass plate is preferably used as a window glass for automobiles.

Still further, the present invention provides a glass plate which has the following composition:
SiO$_2$ 66.0-74.0 mass %,
Al$_2$O$_3$ 2.0-4.0 mass %,
CaO 7.0-10.0 mass %,
MgO 3.8-6.0 mass %,
Na$_2$O 12.6-14.6 mass % and
K$_2$O 0.4-2.0 mass %, in a total amount of these components of at least 96 mass %, and
SiO$_2$+Al$_2$O$_3$ 70.0-74.0 mass %,
CaO+MgO 12.5-14.5 mass %,
Na$_2$O+K$_2$O 13.5-15.5 mass %, and
CaO/MgO (mass ratio)=1.7-2.2.

Now, the present invention will be described in detail with reference to the preferred embodiments.

The glass plate to be used for the tempering method of the present invention has an average linear thermal expansion coefficient of at least $88 \times 10^{-7}/°$ C. at a temperature of from 50 to 300° C. If the average linear thermal expansion coefficient is lower than this, the glass plate tends to be poor in readily tempering properties. It is preferably at least $89 \times 10^{-7}/°$ C., particularly preferably at least $90 \times 10^{-7}/°$ C. However, a glass having an extremely high average linear thermal expansion coefficient has significantly different physical properties such as a softening point as compared with a conventionally used soda lime silicate glass in many cases. Accordingly, it is necessary to change a production process to use such a glass, such being impractical. Practically, the upper limit of the average linear thermal expansion coefficient at a temperature of from 50 to 300° C. is at a level of $92 \times 10^{-7}/°$ C., particularly at a level of $91 \times 10^{-7}/°$ C.

Further, the glass plate to be used for the tempering method of the present invention has a softening point of from 715 to 740° C. Here, the softening point is defined as a temperature measured by a test method as disclosed in JIS R3104. If the softening point exceeds this range, it may be necessary to change the existing production process. Particularly, in a case where a ceramic paint which crystallizes by heating in a thermal tempering step is used together, it may be necessary to employ a composition of a ceramic paint which is different from a conventional one, such as one which crystallizes at a temperature different from a conventional one, in some cases, such being disadvantageous. The softening point is preferably at least 720° C., particularly preferably at least 725° C. Further, it is preferably at most 735° C., particularly preferably at most 730° C.

Further, in the present invention, the glass plate is quenched from an initial glass temperature of quenching at which the viscosity is within a range of from $10^9$ to $10^{10}$ poise, to a temperature at which the viscosity is $10^{12}$ poise, so that the heat transfer coefficient h (W/m$^2$K) satisfies the above formula (1) or (2), where t (mm) is a glass plate thickness. Here, it is more preferred to satisfy the formula (2) than the formula (1).

If the initial glass temperature of quenching is higher than a temperature at which the viscosity is $10^9$ poise, the glass plate is softened too much, whereby optical quality may not be maintained. Preferably, the initial glass temperature of quenching is at most a temperature at which the viscosity is $10^{9.3}$ poise. On the other hand, if the initial glass temperature of quenching is lower than a temperature at which the viscosity is $10^{10}$ poise, the glass plate tends to be poor in readily tempering properties. Preferably, the initial glass temperature of quenching is at least a temperature at which the viscosity is $10^{9.7}$ poise.

Further, if the heat transfer coefficient at the time of quenching does not satisfy the above formula (1) or (2), the glass plate may not adequately be tempered.

The formulae (1) and (2) are obtained by calculating heat transfer coefficients with which predetermined midplane tensile residual stresses are caused when a glass plate having a coefficient of linear thermal expansion of 90×10$^{-7}$/° C. is quenched from 660° C., at thicknesses of 2.25 mm, 2.5 mm and 2.8 mm, and fitting the obtained respective heat transfer coefficients with a parabola, in accordance with Narayanaswamy O. S., Journal of the American Ceramics Society, vol. 61, No. 3-4 (1978), 146-152. Here, the predetermined midplane tensile residual stresses are 50 MPa with a thickness of 2.8 mm, 51 MPa with a thickness of 2.5 mm and 54 MPa with a thickness of 2.25 mm, and it can be assumed that the glass plate is adequately tempered when such a midplane tensile residual stress is caused.

Specifically, the glass plate of the present invention preferably has the following composition:
$SiO_2$ 66.0-74.0 mass %,
$Al_2O_3$ 1.5-4.0 mass %,
CaO 7.0-10.0 mass %,
MgO 3.8-6.0 mass %,
$Na_2O$ 12.6-14.6 mass % and
$K_2O$ 0.4-2.0 mass %, in a total amount of these components of at least 96 mass %, and
$SiO_2+Al_2O_3$ 70.0-74.0 mass %,
CaO+MgO 12.0-14.5 mass % and
$Na_2O+K_2O$ 13.5-15.5 mass %.

Now, the components and their upper and lower limits of the above composition will be described below.

$SiO_2$ is a component to secure weather resistance, and if it is less than 66.0 mass %, the weather resistance may decrease. It is more preferably at least 67.0 mass %. Further, if it exceeds 74.0 mass %, the viscosity tends to be high, and melting may be difficult. It is more preferably at most 73.0 mass %, particularly preferably at most 72.0 mass %.

$Al_2O_3$ is a component to secure weather resistance, and if it is less than 1.5 mass %, the weather resistance may decrease. It is more preferably at least 1.7 mass %, particularly preferably at least 1.8 mass %. Further, if it exceeds 4.0 mass %, the viscosity tends to be high, and melting may be difficult. From this viewpoint, it is more preferably at most 3.5 mass %, particularly preferably at most 3.3 mass %.

CaO is a component to improve melting ability of raw materials, and if it is less than 7.0 mass %, the melting ability may decrease. It is more preferably at least 7.4 mass %, particularly preferably at least 8.4 mass %. Further, if it exceeds 10.0 mass %, the glass is likely to be devitrified, and stability when formed into a float glass may decrease. It is more preferably at most 9.8 mass %, particularly preferably at most 9.6 mass %.

MgO is a component to improve melting ability of raw materials, and if it is less than 3.8 mass %, the melting ability may decrease. It is more preferably at least 4.0 mass %, particularly preferably at least 4.2 mass %. Further, if it exceeds 6.0 mass %, the glass is likely to be devitrified, and stability when formed into a float glass may decrease. It is more preferably most 5.8 mass %, particularly preferably at most 5.6 mass %.

$Na_2O$ is a component to improve melting ability of raw materials, and if it is less than 12.6 mass %, the melting ability may decrease. It is more preferably at least 12.8 mass %, particularly preferably at least 13.0 mass %. Further, if it exceeds 14.6 mass %, the weather resistance may decrease. It is more preferably at most 13.8 mass %, particularly preferably at most 13.6 mass %.

$K_2O$ is a component to improve melting ability of raw materials, and if it is less than 0.4 mass %, the melting ability may decrease. It is more preferably at least 0.5 mass %, particularly preferably at least 0.9 mass %. Further, if it exceeds 2.0 mass %, the weather resistance may decrease, and the cost of the glass plate tends to increase. It is more preferably at most 1.8 mass %, particularly preferably at most 1.6 mass %.

In the composition of the glass plate of the present invention, the total amount of $SiO_2$, $Al_2O_3$, CaO, MgO, $Na_2O$ and $K_2O$ is preferably at least 96 mass %. If it is less than this, physical properties depart from those of a conventionally used soda lime silicate glass, and it may be necessary to significantly change a production process of a conventional glass plate.

Further, the total amount of $SiO_2$ and $Al_2O_3$ is preferably at least 70.0 mass % so as to prevent lowering of the softening point, and it is preferably at most 74.0 mass % so as to prevent decrease in the coefficient of linear thermal expansion and a resulting decrease in readily tempering properties. The total amount of CaO and MgO is preferably at least 12.0 mass % so as to prevent decrease in the coefficient of linear thermal expansion and a resulting decrease in readily tempering properties, and preferably at most 14.5 mass % so as to prevent lowering of the softening point. The total amount of $Na_2O$ and $K_2O$ is preferably at least 13.5 mass % so as to prevent decrease in the coefficient of linear thermal expansion and a resulting decrease in readily tempering properties, and preferably at most 15.5 mass % so as to prevent lowering of the softening point.

Further, SrO or BaO may be used instead of CaO or MgO within a range of not impairing the effects of the present invention. Further, $Li_2O$ may be used instead of $Na_2O$ or $K_2O$ within a range of not impairing the effects of the present invention.

Further, to the glass plate of the present invention, as e.g. a residual component of refining agents, coloring components or components improving light transmission and absorption function, $Fe_2O_3$, CoO, Se, NiO, $Cr_2O_3$, MnO, $V_2O_5$, $TiO_2$, $CeO_2$, SnO, ZnO or $SO_3$ may be added within a range of not impairing the effects of the present invention.

As one measure indicating the readily tempering properties of a glass plate, a difference between a temperature at which the viscosity is $10^9$ poise and a temperature at which the viscosity is $10^{12}$ poise (hereinafter referred to as "tempering viscosity temperature difference") is mentioned. If the tempering viscosity temperature difference is small, the readily tempering properties tend to improve. Specifically, the tempering viscosity temperature difference is preferably at most 100° C., particularly preferably at most 95° C. However, glass having an extremely small tempering viscosity temperature difference tends to have significantly different physical properties such as a softening point as compared with conventionally used soda lime silicate glass in many cases. Accordingly, it may be necessary to change a production process to use such a glass, such being impractical. Practically, the tempering viscosity temperature difference is at least 90° C.

In order to decrease the tempering viscosity temperature difference, it is effective to increase the total amount of CaO and MgO. On the other hand, if the total amount of CaO and MgO is increased, the devitrification temperature may increase, and stability in float forming may decrease. Further, the softening point may also be lowered.

Taking the above points into consideration, the composition of the glass plate of the present invention particularly preferably satisfies the following conditions:

$Al_2O_3$ 2.0-4.0 mass %,
CaO+MgO 12.5-14.5 mass % and
CaO/MgO (mass ratio)=1.7-2.2.

When the above conditions are satisfied, glass capable of being readily tempered, having a relatively high softening point, can be obtained, without substantially impairing stability in float forming.

More preferably, the following conditions are satisfied:

$Al_2O_3$ 2.5-4.0 mass %,
CaO+MgO 13.0-14.5 mass % and
CaO/MgO (mass ratio)=1.7-2.2.

The method for producing the glass plate of the present invention is not particularly limited, but the glass plate can be produced as follows for example. A blended material is continuously supplied to a melter and heated to about 1,500° C. by e.g. heavy oil for vitrification. Then, this molten glass is refined, and then formed into a glass plate having a predetermined thickness by e.g. a float process. Then, this glass plate is cut into a predetermined shape to produce the glass plate of the present invention.

Then, the cut glass plate is subjected to a tempering treatment. The tempering treatment is carried out, as mentioned above, by heating the glass plate to a predetermined temperature and then quenching it. Simultaneously with the heating for the tempering treatment, bending or baking of a ceramic paint may be carried out.

Now, the present invention will be explained in further detail with reference to Examples. However, it should be understood that the present invention is by no means restricted to such specific Examples.

Using as materials silica sand, feldspar, dolomite, soda ash, salt cake, ferric oxide, titanium oxide and cerium oxide, a batch prepared so that an aimed composition as identified in Table 1 would be obtained was melted in a conventional type melter (an atmosphere at an $O_2$ concentration at a level of 2%), and the molten glass was supplied to a small size float test apparatus connected to the melter to produce a glass plate.

The compositions are shown in Table 1 together with physical properties of the glass plates. Examples are all examples of the present invention.

TABLE 1

|  | Examples | | | | | | | | |
|---|---|---|---|---|---|---|---|---|---|
|  | 1 | 2 | 3 | 4 | 5 | 6 | 7 | 8 | 9 |
| *1 | 88 | 92 | 89 | 90 | 90 | 90 | 90 | 92 | 91 |
| *2 | 725 | 720 | 726 | 724 | 722 | 725 | 721 | 710 | 727 |
| SiO2 | 71.3 | 69.1 | 70.5 | 69.9 | 68.5 | 69.5 | 68.2 | 69.1 | 68.5 |
| Al2O3 | 1.6 | 2.5 | 1.7 | 2.5 | 1.8 | 2.1 | 3.1 | 1.8 | 3.1 |
| CaO | 7.7 | 8.2 | 8.2 | 8.4 | 8.4 | 8.8 | 8.4 | 9.4 | 8.5 |
| MgO | 4.4 | 4.4 | 4.4 | 4.0 | 4.2 | 4.4 | 4.8 | 4.1 | 4.4 |
| Na2O | 13.3 | 13.9 | 12.9 | 13.9 | 13.7 | 13.3 | 13.5 | 13.8 | 13.5 |
| K2O | 0.9 | 1.1 | 1.5 | 0.5 | 0.8 | 1.1 | 1.1 | 1.0 | 1.2 |
| Subtotal | 99.15 | 99.15 | 99.15 | 99.15 | 97.35 | 99.15 | 99.05 | 99.22 | 99.15 |
| SO3 | 0.24 | 0.24 | 0.24 | 0.24 | 0.10 | 0.24 | 0.24 | 0.21 | 0.24 |
| Fe2O3 | 0.50 | 0.50 | 0.50 | 0.50 | 0.60 | 0.50 | 0.60 | 0.51 | 0.50 |
| TiO2 | 0.14 | 0.14 | 0.14 | 0.14 | 0.40 | 0.14 | 0.14 | 0.01 | 0.14 |
| CeO2 | 0.00 | 0.00 | 0.00 | 0.00 | 1.50 | 0.00 | 0.00 | 0.00 | 0.00 |
| Total | 100.0 | 100.0 | 100.0 | 100.0 | 100.0 | 100.0 | 100.0 | 100.0 | 100.0 |
| SiO2 + Al2O3 | 72.9 | 71.6 | 72.2 | 72.4 | 70.3 | 71.6 | 71.3 | 70.9 | 71.6 |
| RO | 12.1 | 12.6 | 12.6 | 12.4 | 12.6 | 13.2 | 13.2 | 13.5 | 12.9 |
| R2O | 14.2 | 15.0 | 14.4 | 14.4 | 14.5 | 14.4 | 14.6 | 14.8 | 14.7 |
| CaO/MgO | 1.75 | 1.86 | 1.86 | 2.10 | 2.00 | 2.00 | 1.75 | 2.30 | 1.93 |
| T(log η = 9) | 656 | 653 | 657 | 655 | 662 | 656 | 659 | 651 | 658 |
| T(log η = 12) | 561 | 560 | 562 | 562 | 569 | 563 | 566 | 559 | 565 |
| *3 | 95 | 93 | 95 | 93 | 93 | 93 | 93 | 92 | 93 |
| T(log η = 4) | 1034 | 1021 | 1032 | 1026 | 1033 | 1024 | 1028 | 1042 | 1027 |
| *4 | 991 | 1002 | 1007 | 1008 | 985 | 1025 | 1031 | 1030 | 1026 |
| *5 | 43 | 19 | 25 | 18 | 48 | −1 | −3 | 12 | 1 |

*1: Coefficient of linear thermal expansion
*2: Softening point
*3: Tempering viscosity temperature difference
*4: Devitrification temperature
*5: Difference (float formability)

In Table 1, the coefficient of linear thermal expansion is an average linear thermal expansion coefficient at a temperature of from 50 to 300° C. as measured in accordance with JIS R3102, and the unit is $\times 10^{-7}$/° C. Further, the softening point was measured in accordance with JIS R3104, and the unit is ° C. The unit of each component is mass % Here, the values were obtained by extrapolation except for Examples 5 and 6.

T(log η=4), T(log η=9) and T(log η=12) in Table 1 are temperatures at which the viscosity is $10^4$ poise, $10^9$ poise and $10^{12}$ poise, respectively, and the unit is °C. They were calculated from a viscosity curve prepared based on a temperature at which the viscosity was from $10^2$ to $10^5$ poise as measured by a rotating-cylinder method, and a softening point as measured in accordance with JIS R3104. Further, the devitrification temperature was measured by examining presence or absence of devitrification by observation with an optical microscope after a glass plate sample heated in an electric furnace maintained at various temperatures was quenched, and the unit is °C.

The readily tempering properties were evaluated from a difference between a temperature at which the viscosity was $10^9$ poise and a temperature at which the viscosity was $10^{12}$ poise, and shown in the column "tempering viscosity temperature difference" in Table 1. It can be said that the readily tempering properties are high when the tempering viscosity temperature difference is at most 100° C., and the readily tempering properties are particularly high when it is at most 95° C.

The stability in float forming was evaluated from a difference between a devitrification temperature and a temperature at which the viscosity was $10^4$ poise, and shown in the column "difference (float formability)" in Table 1. When the temperature at which the viscosity was $10^4$ poise is the same as or higher than the devitrification temperature, float forming can stably be carried out.

Then, the glass as identified in Example 8 of Table 1 was formed into a glass plate of 1,350×550 mm with a thickness of 2.5 mm, and quenched for tempering from 640° C. at a heat transfer coefficient of 648 W/m²K.

The obtained tempered glass plate was subjected to a test wherein the position of point 3 was fractured, in accordance with JIS R3212, whereupon the number of roughest fragments was from 63 to 142, and an adequate tempering was confirmed.

As mentioned above, according to the glass plate and the method for tempering it of the present invention, a glass plate which is a thin glass plate having a thickness at a level of from 2 to 3 mm, and which has a degree of tempering which is by no means inferior to a conventional glass plate of at least 3 mm, can be obtained. Such a tempered glass plate is useful as e.g. a glass plate for vehicles such as automobiles and trains and further for buildings.

The entire disclosures of Japanese Patent Application No. 2001-099201 filed on Mar. 30, 2001 and Japanese Patent Application No. 2001-293601 filed on Sep. 26, 2001 including specifications, claims and summaries are incorporated herein by reference in their entireties.

What is claimed is:

1. A glass plate which has the following composition:
   $SiO_2$ 66.0-74.0 mass %,
   $Al_2O_3$ 2.0-4.0 mass %,
   CaO 7.0-10.0 mass %,
   MgO 3.8-6.0 mass %,
   $Na_2O$ 12.6-14.6 mass % and
   $K_2O$ 0.4-2.0 mass %,
   in a total amount of these components of at least 96 mass %, and
   $SiO_2+Al_2O_3$ 70.0-74.0 mass %,
   CaO+MgO 12.5-14.5 mass %,
   $Na_2O$ $K_2O$ 13.5-15.5 mass %, and
   CaO/MgO (mass ratio)=1.7-2.2,
   and which has a linear thermal expansion coefficient of at least $90 \times 10^{-7}$ and a softening point of from 720 to 735° C.

2. The glass plate according to claim 1, which has at least one member selected from the group consisting of $Fe_2O_3$, CoO, Se, NiO, $Cr_2O_3$, MnO, $V_2O_5$, $TiO_2$, $CeO_2$, SnO, ZnO and $SO_3$ added thereto.

3. The glass plate according to claim 1, which has a thickness of from 2 to 3 mm.

4. The glass plate according to claim 1, which is obtained by a float process.

5. A window glass for automobiles comprising the glass plate according to claim 1.

6. The glass plate according to claim 1, which has a tempering viscosity temperature difference of at least 90° C. and at most 100° C.

7. The glass plate according to claim 1, which has a tempering viscosity temperature difference of at least 90° C. and at most 95° C.

8. The glass plate according to claim 1, wherein the temperature at which the viscosity becomes $10^4$ poise is higher than the devitrification temperature.

9. The glass plate according to claim 1, which has an upper limit of linear thermal expansion coefficient of $92 \times 10^{-7}$.

10. The glass plate according to claim 1, which has an upper limit of linear thermal expansion coefficient of $91 \times 10^{-7}$.

11. The glass plate according to claim 1, which has a softening point of from 725 to 735° C.

12. The glass plate according to claim 1, which has a softening point of at most 730° C.

* * * * *